April 23, 1935. C. BIRDSEYE 1,998,431
METHOD AND APPARATUS FOR FREEZING FOOD PRODUCTS
Filed Nov. 24, 1931 3 Sheets-Sheet 1
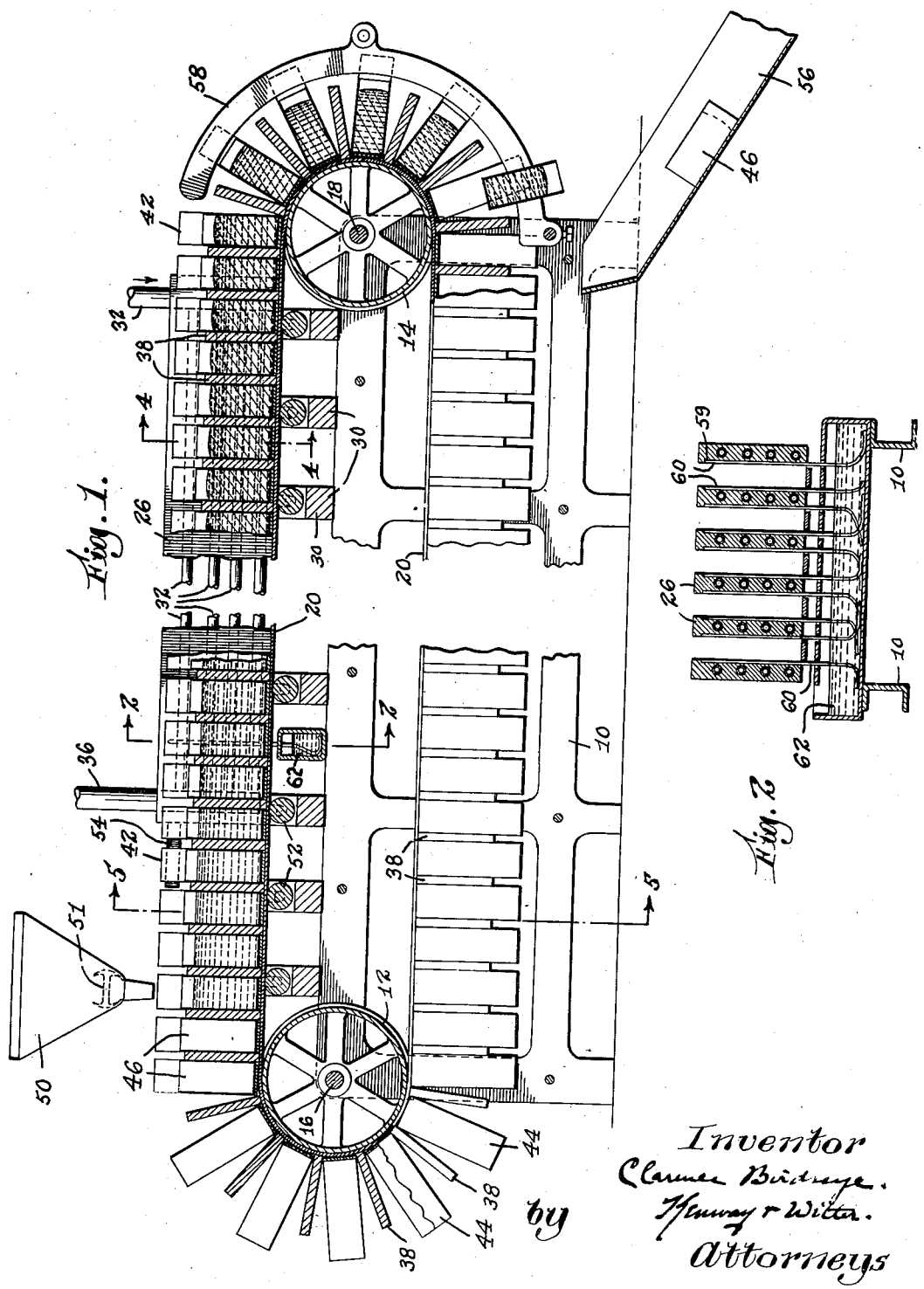

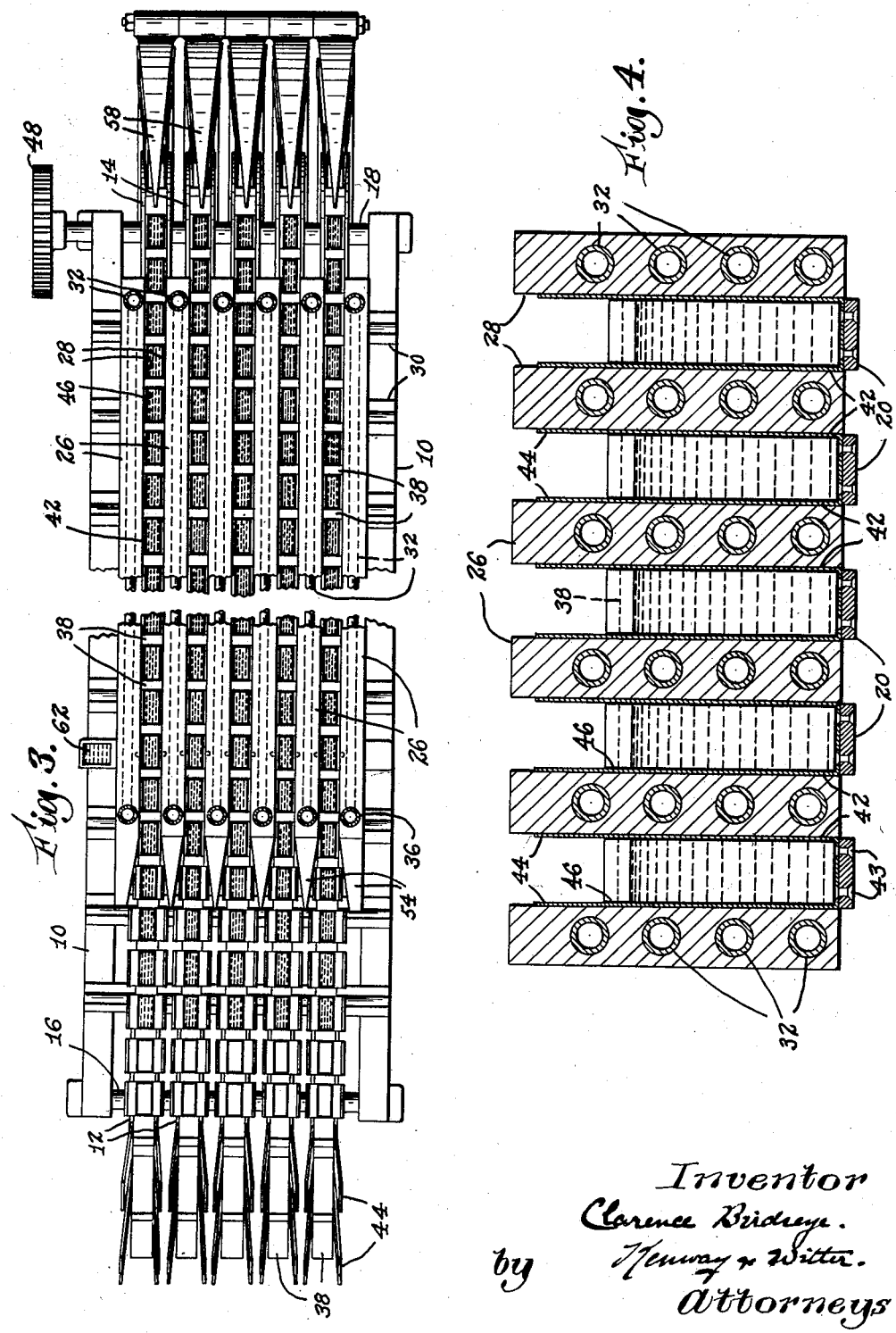

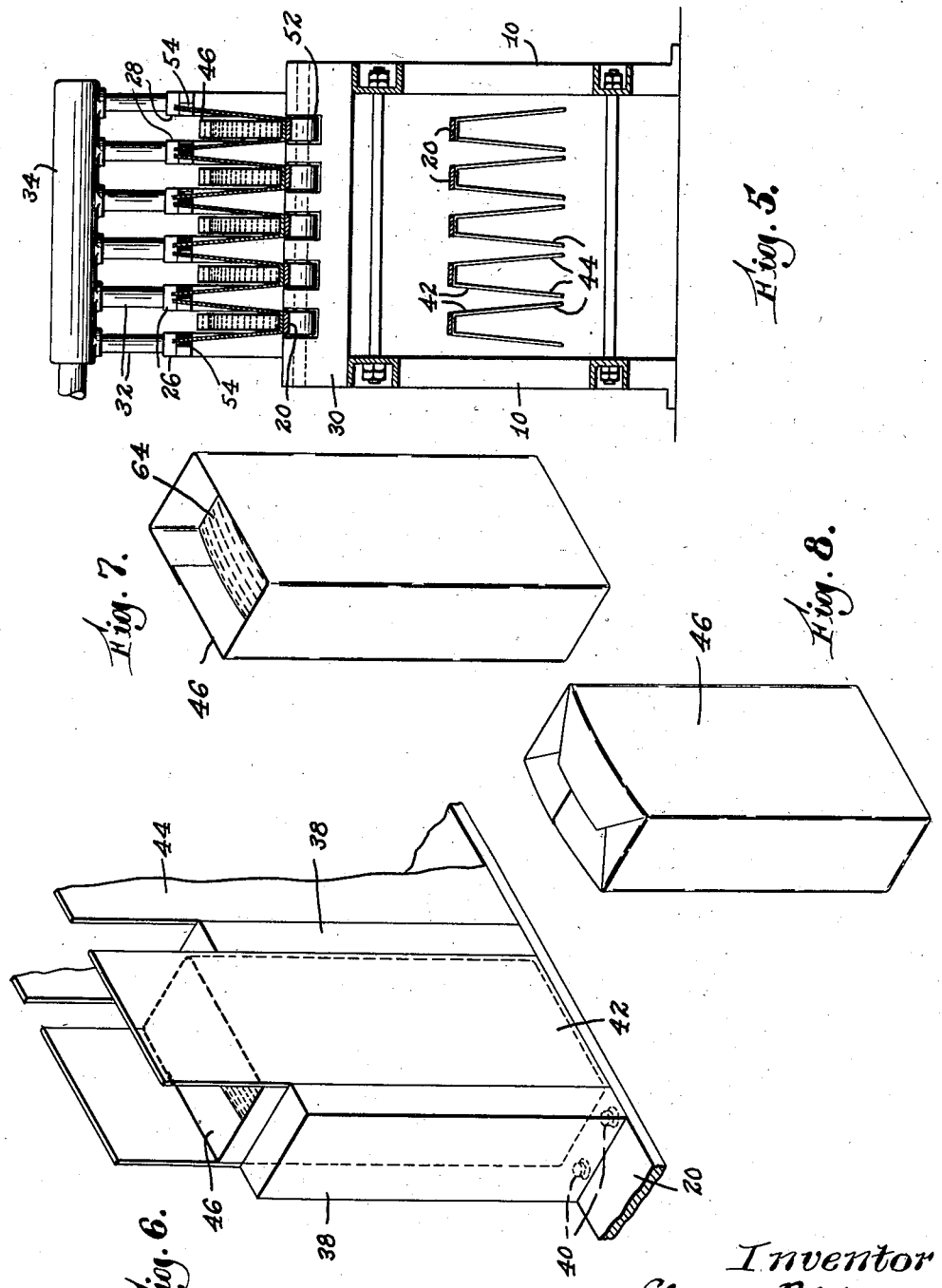

Patented Apr. 23, 1935

1,998,431

UNITED STATES PATENT OFFICE 1,998,431

METHOD AND APPARATUS FOR FREEZING FOOD PRODUCTS

Clarence Birdseye, Gloucester, Mass., assignor to Frosted Foods Company, Inc., Dover, Del., a corporation of Delaware Application November 24, 1931, Serial No. 577,047

17 Claims. (Cl. 62—114)

This invention relates to the art of freezing food products within individual containers which may be utilized to enclose or wrap the frozen product in forming a package thereof for storage and distribution. It consists in a novel method of handling liquid, semi-liquid or comminuted products and in an improved machine by which such products, or any moisture-containing products, may be shaped, wrapped and frozen in an advantageous manner.

In packaging and freezing many food products it is desirable to exclude air completely enough to prevent oxidation from taking place during the freezing, storage and thawing stages. In accordance with my invention such oxidation is prevented by freezing the product within a container, such as a waxed paper or cellophane bag, which subsequently acts as a wrapper therefor and forms a part of a marketable package which is produced. In the method specifically described herein, the container is left open at one end during the freezing operation and the frozen and partially wrapped cake thus formed may then be sealed with a minimum exposure of the product to the atmosphere. It will be apparent that by such procedure only a minimum area of the frozen product is ever exposed and that the greater portion of the frozen cake is protected against the evaporation into or oxidation from the surrounding atmosphere.

An important field of use for my invention is in the freezing of fruit juices, crushed fruit or berries, cooked vegetables, ice cream, gravy and cream products, comminuted meats, and the like. The product, in accordance with my invention, may be deposited within containers which are supported within and act substantially as liners for receptacles or molds of convenient size and shape, wherein the product is converted into solid blocks or cakes in readiness for packing and storage. The procedure may be carried out continuously and automatically if desired and without skilled attention, it being necessary only to supply the containers or liners to the molds and the soft product in bulk to the machine, and to take it away in the form of solid-frozen wrapped blocks of suitable size for consumer packages.

The novel method of my present invention is characterized by the step of passing the product to be frozen, in a mechanically controlled manner, through a refrigerating zone while it is contained within a wrapper-forming container and the latter supported within a mold which shapes the enclosed product into a block or cake. Preferably, the mold is moved while being maintained in direct heat-conductive relation to a refrigerating plate or plates which define the refrigerating zone, whereby heat is removed by conduction and the product thereby quickly frozen or congealed into a solid block.

In another aspect my invention comprises a refrigerating machine including in its construction a heat-conductive plate or plates with means for refrigerating the same, and a receptacle or mold adapted to hold and shape therein the product within a wrapper-forming container, the mold being movable along, and preferably in contact with, the plate or plates to congeal the contained product. Preferably, the machine includes a plurality of such molds and these may be arranged for movement successively to receiving or loading stations, where the containers and unfrozen product are delivered, and then moved in a predetermined path along and adjacent to the plate or plates. This operation may be carried on to good advantage by subjecting the product at opposite sides to the direct action of two heat-conductive plates or members, and in accordance with another feature of the invention two or more such plates are arranged in parallel spaced relation and a carrier member is provided which advances the product between them. As herein shown, the carrier is provided with a plurality of receptacles or molds, portions at least of which are maintained in direct surface engagement with a refrigerating plate or plates whereby a direct heat-conductive path is provided to the product.

A desirable feature of the machine herein shown consists in mechanism adapting it for operation in a continuous process manner. To this end the molds are arranged to be carried in an endless path, a portion of which includes the refrigerating zone. The containers or liners may be inserted in the molds at any convenient loading station and the product to be frozen delivered to the containers at the same or at a subsequent station. For purposes of facilitating the insertion of the containers and the discharging of the frozen product, I prefer so to construct the machine that the molds assume an open position when removed from the refrigerating zone and assume a closed or product-shaping position when passing into the refrigerating zone. As herein shown, the molds are formed with relatively separable end and side walls which may be expanded or separated preparatory to receiving the container and its product. During the passage of the molds into the refrigerating zone these side walls are moved toward each other to the product-shaping position and during their passage through the zone they ride in direct sliding contact with the refrigerating plates in a manner providing a direct heat-conductive path to the product. The product is thus quickly frozen into solid blocks of the desired shape and these blocks are automatically discharged from the molds as the latter open upon passing from the refrigerating zone. The machine of my invention, in its preferred form, is characterized by these features.

I have referred herein to a "wrapper-forming container" and given as an example thereof a bag of waxed paper or sheet cellulose. In this term, however, I wish to include any envelope or wrapper of sheet material capable of holding a moisture-containing or comminuted food product and of serving as the wrapper portion of a marketable package of frozen product. A cardboard carton is another example of such container.

These and other features of the invention will be best understood and appreciated from the following description of a preferred embodiment thereof, selected for purposes of illustration and shown in the accompanying drawings, in which Fig. 1 is a view in side elevation of the machine, partially in section;

Fig. 2 is a sectional view on line 2—2;

Fig. 3 is a plan view of the machine;

Fig. 4 is an enlarged sectional view on line 4—4 of Fig. 1;

Fig. 5 is a similar sectional view on line 5—5 of Fig. 1;

Fig. 6 is an enlarged fragmentary view showing the product in freezing position within a mold;

Fig. 7 is a perspective view of the frozen product as it comes from the machine; and Fig. 8 is a similar view of the closed and sealed package.

The machine illustrated comprises a relatively long frame 10 having a series of equally spaced wheels or pulleys 12 and 14 fast on shafts 16 and 18 journaled in bearings at its opposite ends, the wheels being arranged in alignment to provide five cooperating pairs 12—14, as illustrated. On each pair of pulleys is mounted an endless carrier comprising a metal belt 20, having upper and lower horizontal reaches stretched between the pulleys. The molds for carrying and molding the product to shape during the freezing operation are attached to and carried by these belts and are passed thereby through a refrigerating zone formed by and between parallel heat-conductive plates.

Secured upon the frame 10 is a plurality of elongated rectangular plates or bars 26 having flat and parallel opposed surfaces 28 forming channels therebetween for the passage of the molds. These plates are supported in parallel and edgewise relation on cross beams 30 of the frame and extending longitudinally through each plate is a plurality of pipes 32 for the circulation of brine or other refrigerant. A main header 34 at one end of the plates supplies brine to the pipes and a like header (not shown) at the other end of the plates serves to discharge the brine, risers 32 and 36 being provided between the main headers and their respective pipe ends.

I prefer to employ molds of a somewhat open and collapsible nature whereby the containers and product to be frozen may be easily delivered thereto and the frozen blocks discharged therefrom. To this end the walls of each mold are formed by a plurality of independent members individually secured to and carried by the belt 20. The end walls of the molds are formed by a plurality of spaced plate-like members or partitions 38 secured at one end, as by rivets 40, to the belt and extending outwardly at right angles thereto. I prefer to form the side walls of each mold from a single U-shaped piece 42 of relatively thin spring metal so secured by rivets 43 that the sides 44 thereof form the side walls. The resiliency of the piece 42 is such that the side walls normally diverge outwardly when permitted to do so, as seen in Fig. 5. It will furthermore be noted that the end walls 38 also diverge outwardly in like manner as they are passed around the pulleys 12 and 14. The divergence of the walls aids materially in facilitating the insertion of the containers or liners into the molds and in the discharging of the frozen blocks therefrom, as will be understood.

In carrying out my invention, I preferably employ a bag-like container or envelope 46 which may be of paper-like material, such as cellophane, which is thin, transparent and substantially moisture and vapor-proof. This material is well adapted to the requirements of the case as it is extremely flexible, fairly tough in texture and a good conductor of heat. In process of manufacture the bag is formed with a square sealed bottom so that it presents a water-proof receptacle for the moisture-containing product.

The carrier belts 20 travel at a relatively slow rate from left to right, as seen in Fig. 1, and the containers 46 are inserted in the molds at a point substantially above the pulleys 12 and while the end wall members 38 are in relatively diverging relation. The belts may be driven from any suitable source of power through a gear 48 on the shaft 18, and the movement may be intermittent, if desired, to permit each container to dwell beneath a filling hopper 50 while a charge of the product is being delivered thereto, as by a measuring valve 51. It will be understood that a measured quantity of the product is thus delivered to each container as it arrives in position beneath the hopper 50. When the container is in receiving position it is supported at its opposite edges by the end walls 38 which have been automatically moved to a parallel position.

The upper reaches of the carrier belts may be supported from beneath by any convenient means, as by rollers 52 mounted in the cross beams 30, and as the filled containers within their molds travel from the hopper 50 toward the refrigerating plates 26 the diverging side walls 44 engage converging walls of forwardly-projecting members 54 which are in effect continuations of the heat-conductive plates 26. The side walls of the molds are moved inwardly by their engagement with these surfaces to a parallel relation in which they engage against the parallel surfaces 28 of the plates 26. In this position, therefore, all four walls of each mold are closed in a manner pressing against and conforming the filled container to the shape it is desired in the final frozen product. Since the filled bag or container is caused by the weight or pressure of the product therein to conform accurately to the inner walls of the molds it takes the shape of the mold, makes intimate contact therewith and eliminates any air pockets which, if present, would retard the refrigerating operation. Preferably the bag is filled to a point slightly below the top of the mold in order to allow space for expansion of the product in the freezing operation.

Pressure of the thin side walls 44 against the contained product provides intimate contact therewith and the normal outward spring pressure of these walls against the surfaces 28 insures an intimate contact with the heat-conductive plates 26. A direct heat-conductive path is thus provided from the plates 26 to the product through the thin side walls 44 and the product may be thereby quickly frozen into solid blocks as the molds travel through the refrigerating zone.

When the molds pass out from the refrigerating zone and about the pulleys 14, the end and side walls move outwardly away from the frozen product which is thereupon free to drop from the molds onto a chute 56. It may be desirable to provide arcuate wedge-shaped members 58 about the pulleys 14 for disengaging and positively separating the side walls 44 from the frozen blocks.

For the purpose of facilitating the freezing operation the plate members 38 are preferably made of a width to touch both surfaces 28 of the heat-conductive plate with a scraping engagement thereby removing any frost gathered thereon. Also, further to facilitate the operation, a low temperature lubricant, such as glycerine, may be fed against the refrigerating surfaces 28 to prevent the building up of frost on the plates and provide a liquid seal and a lubricant between the engaging surfaces 44 and 28. As one convenient means of supplying such a lubricant I have illustrated the forward ends of the surfaces 28 as grooved vertically at 59 and provided therein with wicks 60 extending downwardly into a lubricant bath 62, the lubricant being adapted to travel up the wicks in sufficient quantity to perform the functions stated.

The product of the machine as above described is shown in Fig. 7 and comprises the container or bag 46 frozen solidly to the sides and bottom of the cake 64 in a manner shielding it effectively from the atmosphere and from incident oxidation except for the relatively small exposed area at the open end of the container. The cake may be immediately sealed by folding in the projecting ends of the bag in the manner shown in Fig. 8 and this may be carried out in automatic wrapping machinery or otherwise. The result, however, is a completely sealed, solidly frozen cake of convenient size, effectively protected against loss by evaporation and the objectionable changes which would result from contact with the atmosphere. On account of the transparent nature of the wrapping the cake also presents an attractive and appetizing appearance.

The invention has been disclosed in its specific application to the packaging and freezing of a liquid product in an open-ended bag and under conditions rendering it difficult to close or seal the bag until after its contents have been frozen or at least partially solidified. It will be understood, however, that in packaging and freezing comminuted products, such for example as hamburg steak, the wrapper-forming container may be introduced into the molds in closed and sealed condition if so desired.

Having thus described my invention, what I claim as new and desire to secure by Letters Patent is:

1. A refrigerating machine comprising a carrier, a plurality of spaced wall members on said carrier and a plurality of U-shaped members secured to said carrier between said wall members, said members being so positioned as to cooperate to form molds for confining a product to be frozen, means providing a freezing zone, means for moving said molds into said zone, and means in said zone for freezing said product in said molds.

2. A machine for freezing food products within individual containers, comprising means providing spaced plane refrigerating surfaces, a plurality of molds each adapted to receive and having walls movable to support and shape one of said containers having therein the product to be frozen, and means for carrying a plurality of lines of molds and moving them in aligned formation in sliding contact with said refrigerating surfaces.

3. A refrigerating machine comprising a heat-conductive plate, means for refrigerating the same, and a plurality of molds movable across said plate, each mold having initially diverging walls arranged to be brought into parallel relation to confine a product to be frozen and one side wall thereof being of heat-conducting material and in sliding contact with the plate.

4. A refrigerating machine comprising a pair of spaced heat-conductive plates, means for refrigerating the plates, and a plurality of molds movable between and in sliding contact with the plates, each mold having initially diverging walls arranged to be brought into parallel relation to confine a product to be frozen in position closely adjacent to but out of contact with said plates.

5. A refrigerating machine comprising a pair of spaced heat-conductive plates, means for refrigerating the plates, and a plurality of molds movable between the plates and in engagement therewith, each mold having opposite side walls of heat-conductive material normally diverging but arranged to be brought into parallel relation before making direct sliding contact with the plates.

6. A refrigerating machine comprising a pair of spaced heat-conductive plates, means for refrigerating the plates, and a plurality of molds movable between the plates and adjacent thereto, each mold comprising two end walls and a U-shaped member of relatively thin metal therebetween forming the cooperating side walls of the mold.

7. A refrigerating machine comprising a pair of spaced heat-conductive plates having flat and parallel surfaces forming a channel therebetween, means for refrigerating the plates, an endless belt having one reach thereof extending between the planes of the two surfaces and adjacent to the plates, a plurality of spaced and outwardly-projecting wall members on the belt and of a width substantially equal to the spacing of said surfaces, and a plurality of U-shaped and outwardly-projecting members of good heat-conductive material secured to the belt between the first-named members, the said members cooperating to provide molds to confine the product to be frozen and movable between and in sliding contact with the surfaces of the plates.

8. A refrigerating machine comprising a pair of spaced heat-conductive plates, means for refrigerating the plates, a plurality of molds movable to and between the inner surfaces of the plates and in contact therewith, each mold having relatively thin opposite side walls normally diverging outwardly a distance greater than the space between the plates, and means for moving the said walls inwardly sufficiently to enter into said space and engage against said surfaces as the molds approach the plates.

9. A refrigerating machine comprising means providing a refrigerating zone, a plurality of molds movable therethrough and adapted to contain products to be frozen, the molds having opposite side walls which are movable outwardly away from the product therein, and means for moving the walls to free them from the product after it has been frozen in said refrigerating zone.

10. A refrigerating machine comprising an endless carrier having upper and lower horizontal reaches, a plurality of open-ended molds carried thereby, a pair of refrigerating plates located at opposite sides of the upper reach of the carrier, between which the molds are passed by the carrier, and means located adjacent the receiving ends of the plates for delivering into the molds a measured charge of the product to be frozen.

11. A refrigerating machine comprising a plurality of molds arranged in adjacent planes, endless carriers supporting said molds in their upper and lower horizontal reaches, a plurality of refrigerating plates located respectively between the molds of adjacent carriers, the molds being in sliding contact with the plates when passing therebetween, and means located adjacent to the receiving ends of the plates for delivering to the molds a product to be frozen.

12. A refrigerating machine comprising an endless carrier having upper and lower horizontal reaches, a plurality of molds carried thereby, a pair of refrigerating plates at opposite sides of the upper reach of the carrier, between which the molds are passed by the carrier, means for opening the molds when removed from the plates and for closing them into product-shaping position upon arriving in product-freezing location between the plates.

13. A refrigerating machine comprising a heat-conductive plate, means for refrigerating the same, and a plurality of molds movable across said plate, each mold being adapted to confine a product to be frozen and one side wall thereof being relatively thin and in flat sliding contact with the plate, and means for supplying a lubricant to one of the surfaces of said sliding contact.

14. The method of freezing moisture-containing products, which consists in introducing a mold into heat-conductive relation to a refrigerating surface, at about the same time filling the mold with the unfrozen product, and thereafter moving the filled mold in a mechanically controlled manner along said refrigerating surface.

15. The method of freezing food products, which consists in successively delivering measured portions of the unfrozen product to a series of wrapper-forming containers, each within a mold, and then moving the filled molds in a procession between, and in heat-conductive relation to, spaced stationary refrigerating surfaces.

16. A machine for freezing food products within individual wrapper-forming containers, comprising means providing a stationary refrigerating surface, a plurality of molds each adapted to receive one of said containers, a reservoir for liquid food product, a measuring valve therefor, and means for consecutively moving the molds first into registration with said valve whereby they may be filled with the product and then across said refrigerating surface.

17. A refrigerating machine comprising means supplying a refrigerating zone, an endless carrier movable through said zone and having a series of molds thereon each presenting initially diverging walls arranged to be brought into parallel relation preliminarily to the entrance of the mold into the refrigerating zone, whereby a flexible container may be inserted in the mold and thereafter engaged by the side walls thereof.

CLARENCE BIRDSEYE.